(12) United States Patent
Smith

(10) Patent No.: US 7,731,822 B2
(45) Date of Patent: Jun. 8, 2010

(54) HIGH CAPACITY ANGLED TOWER

(76) Inventor: Strom W. Smith, P. O. Box 380, Gulfport, MS (US) 39502

( * ) Notice: Subject to any disclaimer, the term of this patent is extended or adjusted under 35 U.S.C. 154(b) by 977 days.

(21) Appl. No.: 11/061,419

(22) Filed: Feb. 18, 2005

(65) Prior Publication Data
US 2005/0183941 A1    Aug. 25, 2005

Related U.S. Application Data

(60) Provisional application No. 60/545,847, filed on Feb. 19, 2004.

(51) Int. Cl.
 B01D 3/32    (2006.01)
 B01D 3/42    (2006.01)
(52) U.S. Cl. .................... 203/1; 159/26.2; 159/28.6; 159/44; 159/47.1; 202/158; 203/100; 261/128; 261/114.3
(58) Field of Classification Search ............... 159/26.2, 159/28.6, 44, 47.1; 202/158; 203/1, 100; 261/128, 114.3
See application file for complete search history.

(56) References Cited

U.S. PATENT DOCUMENTS

| | | | | |
|---|---|---|---|---|
| 1,797,232 A | * | 3/1931 | How ........................... 55/461 |
| 2,954,821 A | * | 10/1960 | Baumann et al. ............. 159/1.1 |
| 3,403,719 A | * | 10/1968 | Geiringer ................... 159/26.2 |
| 3,458,405 A | * | 7/1969 | Akers ......................... 202/236 |
| 3,505,111 A | * | 4/1970 | Malek ......................... 127/16 |
| 4,234,544 A | | 11/1980 | Christman | |
| 5,047,179 A | | 9/1991 | Nye | |
| 5,338,517 A | | 8/1994 | Evans, III et al. | |
| 5,500,116 A | | 3/1996 | Nakayama et al. | |
| 5,632,962 A | * | 5/1997 | Baker et al. ................. 422/211 |
| 6,068,244 A | | 5/2000 | Burton et al. | |
| 6,422,539 B1 | | 7/2002 | Burton et al. | |
| 6,471,865 B1 | | 10/2002 | Reaves et al. | |
| 6,491,856 B1 | * | 12/2002 | Noirot ......................... 264/259 |
| 7,264,695 B2 | * | 9/2007 | Foster et al. ................. 202/234 |

* cited by examiner

*Primary Examiner*—Virginia Manoharan
(74) *Attorney, Agent, or Firm*—Keeling Patents & Trademarks LLC; Kenneth A. Keeling; Melissa M. Martinez

(57) ABSTRACT

A column for distillation or fluid-fluid separation is oriented at an angle to the horizontal other than vertical to provide increased transfer plate surface area within the interior of a column of determined diameter and to reduce overall height of the structure.

24 Claims, 5 Drawing Sheets

HIGH CAPACITY ANGLED TOWER

CROSS-REFERENCE TO RELATED APPLICATIONS

This application claims the benefit of U.S. Provisional Patent Application No. 60/545,847 entitled, "High Capacity Angled Tower," filed on Feb. 19, 2004 in the United States Patent and Trademark Office.

STATEMENT REGARDING FEDERALLY SPONSORED RESEARCH OR DEVELOPMENT

Not Applicable.

BACKGROUND OF THE INVENTION

1. Field of the Invention

The present invention relates to industrial columns and towers commonly used for reacting, distilling, separating, and extracting multiple components. More particularly, the present invention increases the capacity of industrial columns and towers through the acutely angular installation of the column or tower.

2. Description of the Related Art

Distillation is a widely applied separation technology. Distillation is continually affected by rising energy costs, thereby making increases in efficiency desirable. Commercially-practiced distillation methods operate on differences in boiling points between liquids, separating chemicals by the difference in how easily the chemicals vaporize. Distillation is ideal when the mixture is comprised of chemicals with distinct and separate boiling points. Distillation manipulates varying volatilities of components of a process fluid by applying and removing heat under high pressure or vacuum. The application and removal of heat fractionates individual components from the process fluid.

A process fluid is introduced to the distillation column and heat is gradually applied. As heat is applied to the column, volatile components in the liquid begin to vaporize and ascend to the top of the column. As the vapor ascends to the top of the column, the vapor interacts with the descending condensed liquid, thereby providing interaction between the liquid and vapor phases. Separation between components is enhanced when there is greater contact between the vapors and the liquids. Once the vapors reach the top of the distillation column, the vapor can be partitioned away from the remaining process fluid through outlet lines positioned proximate the top of the distillation column.

Liquid-liquid extraction is widely applied for many industrial purposes, including food, chemical, pharmaceutical, and refining. Liquid-liquid extraction is ideal for purification of heat sensitive materials and for recovery of products from reactions. Liquid-liquid extraction is extensively used in the hydrocarbon industry.

While distillation focuses on the boiling points of liquids, liquid-liquid extraction focuses on chemical structure. Liquid-liquid extraction operates on mass transfer between two or more immiscible phases. A first fluid solution is contacted with a second immiscible fluid that exhibits an affinity towards one or more components in the first fluid solution. The immiscible liquid extracts the components from the first fluid solution. The components in the component-bearing immiscible fluid are not as tightly bound to the immiscible fluid, thereby permitting subsequent component separation. The effectiveness of the extraction is related to the degree of contact between the immiscible phases. An increase in contact area results in an increase in extraction rate. Therefore, various improvements directed towards greater contact within the column have yielded greater extraction results.

The vapor handling capacity of a column or tower is generally proportional to the active area of the trays. The active area is defined as the cross-sectional area through which the upward flowing vapor passes. Therefore, previous attempts in the industry to increase the capacity of columns or towers have included improvements to the internal components, or more specifically, increasing the active area of the column or tower. Despite the changes made to internal components, towers and columns have consistently been installed in a vertical orientation. Due to this orientation, the walls of the column or tower are necessarily relatively thick to withstand high force winds. Further, a substantial subterranean foundation is needed to provide stability to the vertical column or tower in high force winds or earthquakes.

One alternative known in the art for increasing the capacity of a column or tower involves increasing the number of fractional trays. Mass transfer occurs when a liquid phase contacts the vapors on the trays. Increasing the number of fractional trays throughout the column increases the interaction between the liquid and vapor phases, thereby increasing the mass transfer between the liquid and vapor phases. While increasing the number of trays in the column is beneficial, the increases in capacity are limited. A specific spacing between the trays is required to facilitate proper operation of the column. If the trays are too close together or too far apart, the column may flood, thereby terminating throughput. Consequently, an increase in the number of trays necessarily increases the height of the column. Depending on restrictions in space and expense, increasing the number of trays may not be feasible.

Another alternative for increasing the capacity of a column is to increase the column diameter. By increasing the column diameter, the surface area of the trays is effectively increased, resulting in a larger active area for interaction between the vapors and liquids.

Previous attempts at modifying downcomer design have also increased the capacity of an industrial column. Downcomers facilitate movement of liquids between the trays. Trays are alternately installed throughout the contactor, wherein one portion of the tray is fixedly attached to the column in a horizontal orientation, and a second portion of the tray is free. Downcomers extend vertically downward from the free end of each tray. The position of the downcomer can affect the overall capacity of the column. Downcomers introduce inactive area within the column, wherein the species within the column do not interact. Recent improvements in the art have included modifying downcomer design to convert the inactive area into an active area, thereby increasing the overall active area. Attempts have included hanging downcomers, wherein the area under the downcomer is made into an active area, either with perforated holes or directional valves. While modifying downcomer design has resulted in increased capacity, installation and maintenance of hanging downcomers is difficult. Further, improper installation and maintenance can actually decrease the overall capacity of the column or tower.

BRIEF SUMMARY OF THE INVENTION

One object of the present invention is to increase the capacity of columns or towers. Another object of the present invention is to reduce the amount of reinforcement required for tower walls and subterranean foundations to provide protection against high winds and earthquakes. Yet a further object of the invention is to provide a tower that is easy to install and maintain.

Accordingly, it is an object of the present invention to
increase the capacity of industrial towers and columns;
increase the active area of the trays;
facilitate installation and maintenance;
reduce tower wall thickness;
reduce required foundations;
reduce stress from earthquake and wind.

A column for distillation or fluid-fluid separation is oriented at an angle to the horizontal other than vertical to provide increased transfer plate surface area within the interior of a column of determined diameter and to reduce overall height of the structure. Other features and advantages of the invention will be apparent from the following description, the accompanying drawing and the appended claims.

DESCRIPTION OF THE INVENTION

Figure 1:
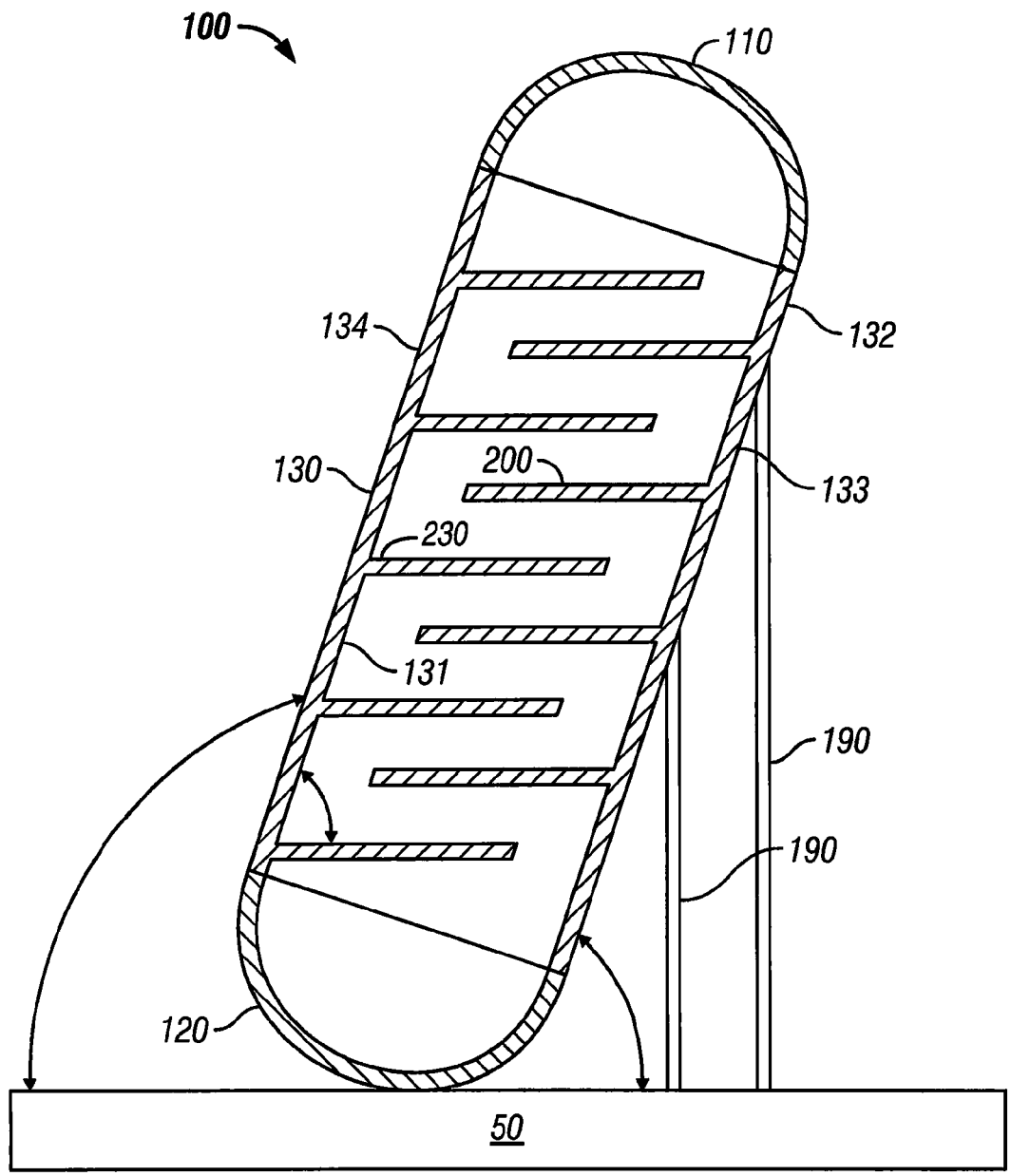
FIG. 1 is a longitudinal cross-sectional view of an installed industrial tower.

FIG. 1 depicts industrial tower 100 installed on foundation 50. Industrial tower 100 is comprised of tower top 110, tower bottom 120, and tower shell 130.

Figure 3:
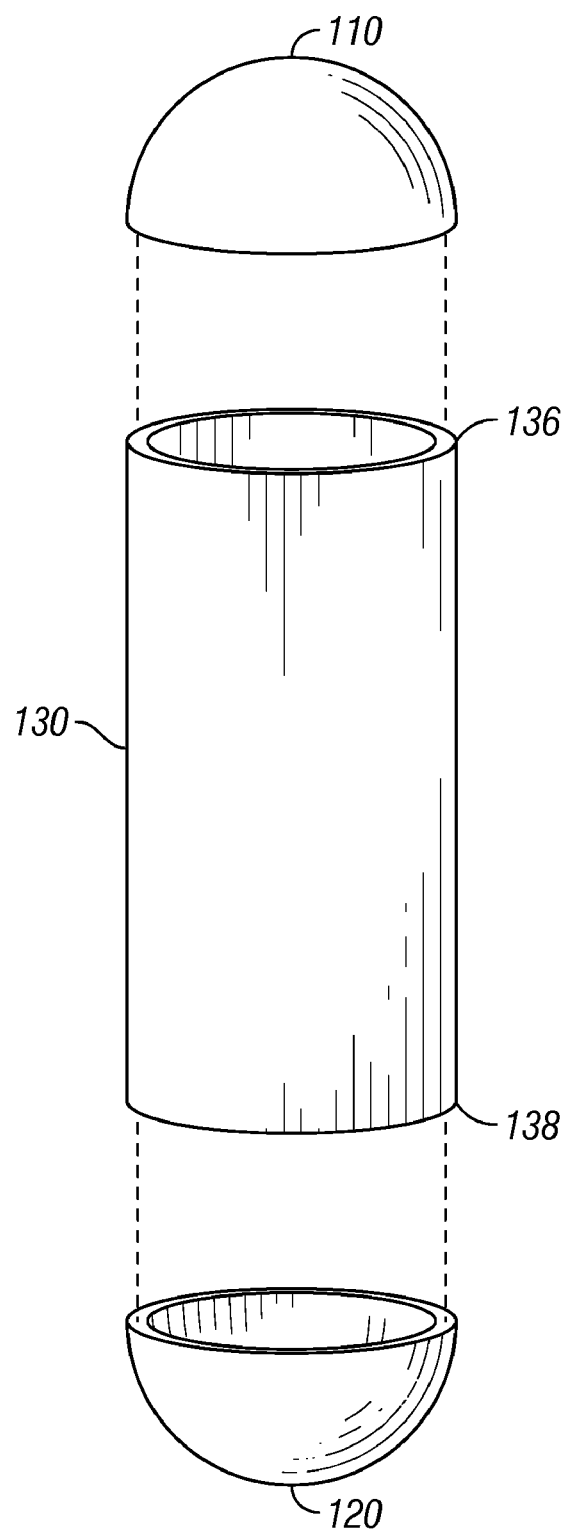
FIG. 3 is an exploded view of an industrial tower.

Tower shell 130 can be of any shape but is preferably a hollow cylinder. Tower shell 130 can be made of stainless steel, carbon steel, or other material known in the art. Tower shell 130 has shell interior surface 131 and shell exterior surface 132. Shell interior surface 131 defines a cavity throughout tower shell 130. Referring to FIG. 3, tower shell 130 terminates at shell first terminal end 136 and shell second terminal end 138. Closed end surfaces tower top 110 and tower bottom 120 are provided proximate shell first terminal end 136 and shell second terminal end 138, respectively.

Industrial tower 100 is angularly installed onto foundation 50 by affixing a plurality of support members 190 to industrial tower 100. Downward facing tower shell side 133 forms an acute tower angle with respect to the horizon. Conversely, upward facing tower shell side 134 forms an obtuse angle with respect to the horizon. By installing industrial tower 100 at an angle offset from vertical, the cross-sectional area of tower 100 is increased, thereby increasing the active area.

A plurality of transfer plates 200 are fixedly attached to shell interior surface 131. The step of fixedly attaching a plurality of transfer plates 200 to the interior surface 131 may occur prior to the placement of the tower shell 130 onto a foundation 50 at an angular disposition with respect to the horizontal plane. Each transfer plate 200 is planar and is configured to be received within shell interior surface 131, such that a section of the perimeter of transfer plate 200 is circumscribed by shell interior surface 131. Transfer plates 200 incorporate a plurality of holes (not shown), which allow fluids and vapors to traverse tower 100. In the prior art vertical tower 300, depicted in FIG. 4, transfer plates 220 have a circular configuration. However, because the industrial tower 100 is installed at an angle relative to tower shell 130, transfer plates 200 may be elliptically configured, resulting in a partially elliptical segment 230, at their interface with shell interior surface 131.

Figure 2:
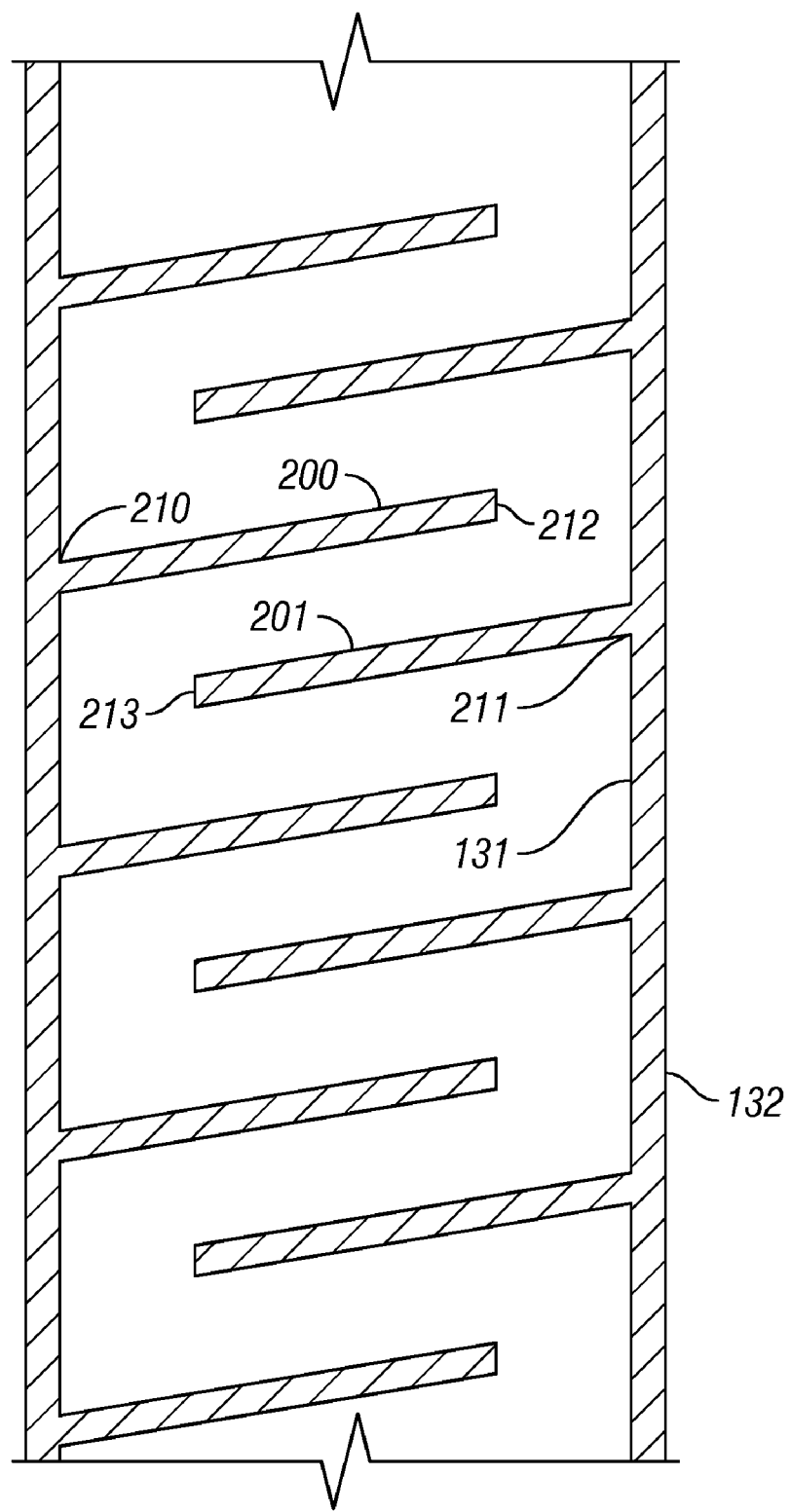
FIG. 2 is a partial cross-sectional view of the industrial tower of FIG. 1.

Transfer plates 200 can be attached through tray rings with clips (not shown) or other means known in the art. Transfer plates 200 enhance separation between the process vapor and liquid in a distillation column, and increase the extraction in a liquid-liquid extraction tower. Referring to FIG. 2, transfer plates 200 are typically installed in an alternating pattern, wherein a first transfer plate 200 is partially affixed to interior shell surface 131, resulting in a first affixed plate surface 210 and a first open plate surface 212, and an opposing second transfer plate 201, resulting in a second affixed plate surface 211 and a second open plate surface 213. Transfer plates 200 and 201 are installed at a uniform spacing commonly known in the art for preventing flooding of tower 100.

Figure 4:
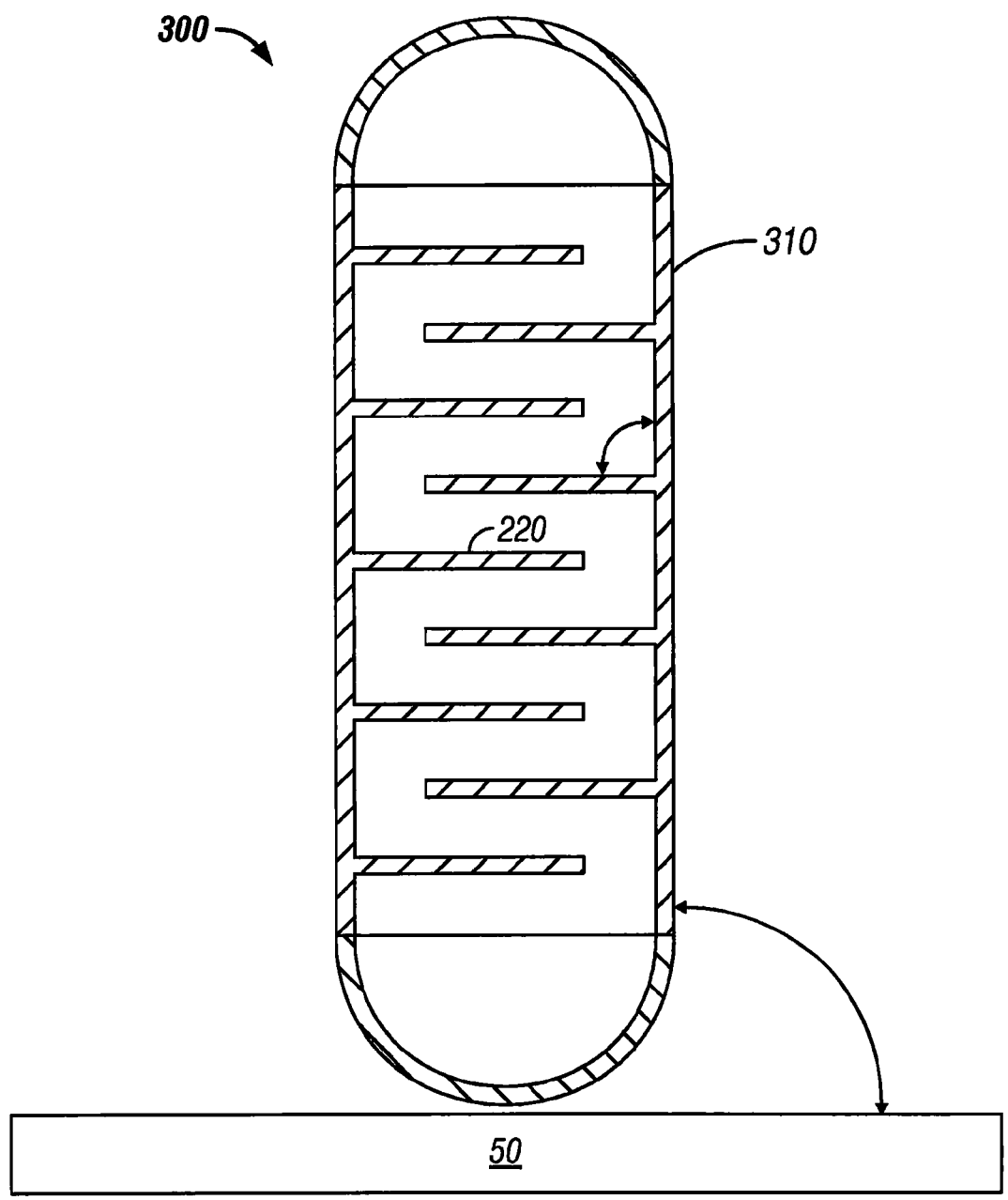
FIG. 4 is a longitudinal cross-sectional view of an installed prior art vertical industrial tower.

Angularly installed tower 100 and vertically installed tower 300 are depicted in FIGS. 1 and 4, respectively. Referring to FIG. 1, transfer plates 200 are preferably installed in a horizontal orientation. Alternatively, transfer plate 200 may be slightly inclined with respect to the horizon. Transfer plates 200 form a transfer plate acute angle with respect to upward facing tower shell side 134. In the preferred embodiment, the transfer plate acute angle is at the same angulation as the tower acute angle. Similarly, referring to FIG. 4, vertical tower transfer plate 220 is preferably installed in a horizontal orientation, thereby forming a right angle with respect to vertical tower shell 310. Thus transfer plates 200 (seen in FIG. 1) are elongated in comparison to vertical tower transfer plate 220 (seen in FIG. 4), thereby resulting in greater surface area for transfer plates 200. By increasing the surface area of transfer plates 200, the capacity of industrial tower 100 is increased.

EXAMPLE

Figure 5:
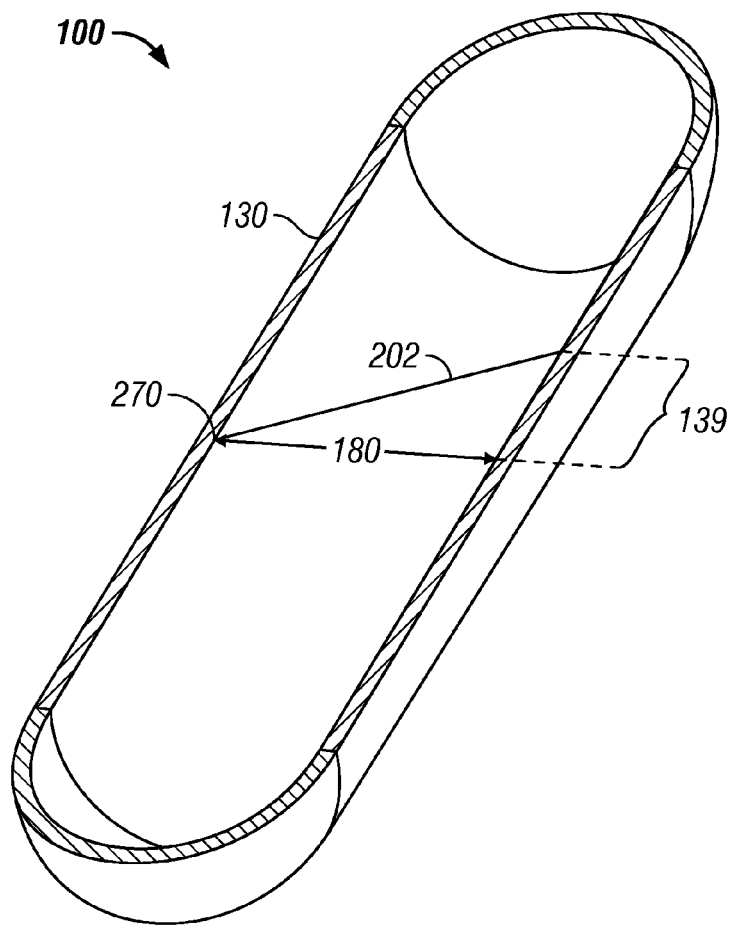
FIG. 5 is a cross-sectional perspective view of the industrial tower of the invention, depicting the tower shell diameter and the major axis of a transfer plate installed therein.
Figure 6:
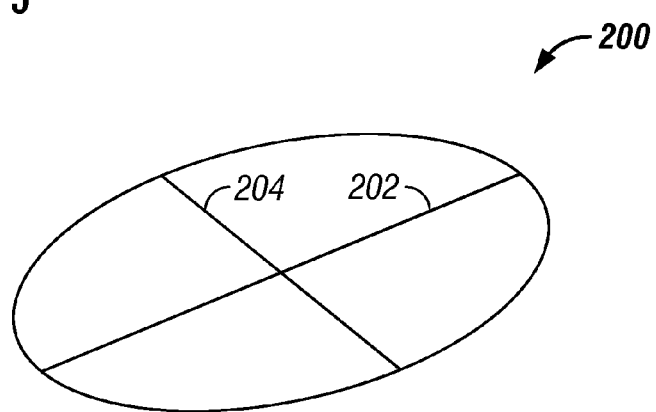
FIG. 6 is a perspective schematic view of a transfer plate.

An angularly installed industrial tower 100 with inner diameter 180 and a transfer plate 200 having major axis 202 are shown in FIGS. 5 and 6, respectively. Diameter 180 extends across industrial tower 100 and is perpendicular with respect to tower shell 130. Major axis 202 extends across industrial tower 100 in a diagonal orientation with respect to tower shell 130, and parallel with respect to the horizon. Diameter 180 forms a right angle with tower shell 130. Diameter 180 intersects major axis 202 at intersection point 270, thereby forming the transfer plate acute angle, as seen in FIG. 1. Thus, a right triangle is formed between diameter 180, major axis 202, and tower shell segment 139.

The surface area of transfer plate 200 can be calculated as detailed below. As previously stated, transfer plate 200 is elliptical. Therefore, transfer plate 200 has major axis 202 and minor axis 204, both seen in FIG. 6. The area of an ellipse can be calculated by multiplying one-half the major axis, one half the minor axis, and pi. Thus:

Area of ellipse=$(\pi)$(major axis/2)(minor axis/2).

Minor axis 204 is equal to diameter 180. Therefore:

Area of ellipse=$(\pi)$(major axis/2)(diameter/2).

When there is a known angle θ, major axis 202 can be determined from the following equation:

(major axis)=(diameter)/((2)(sin θ)).

Thus, the equation to find the surface area of transfer plate 200 becomes:

Area of ellipse=$(\pi)((\text{diameter})/(2)(\sin \theta))(\text{diameter}/2)$ = $((\pi)(\text{diameter}^2))/((4)(\sin \theta))$.

Table 1 summarizes the surface area for transfer plate 200 when the tower is installed at various angles from the horizontal.

TABLE 1

| Angle of Tower | Surface Area (ft.$^2$) | Percent Increase |
| --- | --- | --- |
| 90° | 12.56 | 0% |
| 40° | 19.48 | 55% |
| 38° | 20.40 | 62% |
| 30° | 25.13 | 100% |
| 25° | 29.85 | 137% |

The results in Table 1 show that as the angle of industrial tower 100 becomes more acute with respect to the horizon, the surface area of transfer plate 200 increases. The percent increase is measured against a vertical tower installed at a 90° angle, which is currently practiced in the industry.

The foregoing description of the invention illustrates a preferred embodiment thereof. Various changes may be made in the details of the illustrated construction within the scope of the appended claims without departing from the true spirit of the invention. The present invention should only be limited by the claims and their equivalents.

What is claimed is:

1. A column for distillation or fluid-fluid separation, comprising:
    a hollow column body;
    said body installed on a foundation;
    said body installed at an angular disposition with respect to the horizontal plane;
    said angular disposition offset from vertical;
    a plurality of transfer plates attached to the interior of said column body, each of said transfer plates being positioned such that each of said transfer plates form an acute angle with respect to an upward facing side of said hollow column body;
    said column body having a foundation end and a distal end; and
    at least one support member intermediate said foundation end and said distal end.

2. The column of claim 1, wherein:
    said angular disposition is an acute angle.

3. The column of claim 1, wherein:
    said angular disposition is an obtuse angle.

4. The column of claim 1, wherein:
    each transfer plate is in a horizontal orientation.

5. The column of claim 1, wherein each of said transfer plates is inclined with respect to the horizon.

6. A method for constructing a column for distillation or fluid-fluid separation, said method comprising:
    providing a hollow column body;
    determining a desired output of said column;
    determining an angular position of said column to achieve said desired output;
    installing said column body on a foundation at said angular disposition with respect to the horizontal plane;
    said angular disposition offset from vertical;
    fixedly attaching a plurality of transfer plates to the interior of said hollow column body, each of said transfer plates being positioned such that each of said transfer plates form an acute angle with respect to an upward facing side of said hollow column body; and
    wherein said step of fixedly attaching a plurality of transfer plates to the interior of said hollow column body occurs prior to said step of installing said column body on a foundation at said angular disposition with respect to the horizontal plane.

7. The method of claim 6, wherein:
    said angular disposition is an acute angle; and
    wherein said plurality of transfer plates are each horizontally oriented with respect to the horizon.

8. The method of claim 6, wherein:
    said angular disposition is an obtuse angle; and
    wherein said plurality of transfer plates are each horizontally oriented with respect to the horizon.

9. The method of claim 6, wherein each of said transfer plates is inclined with respect to the horizon.

10. An industrial tower for enhancing surface contact of a first fluid with a second fluid, comprising:
    said industrial tower comprising a hollow cylinder installed on a foundation;
    said industrial tower having an angular disposition other than vertical in relation to said foundation;
    a plurality of transfer plates provided internally of said hollow cylinder;
    said plurality of transfer plates horizontally oriented with respect to said foundation;
    each said plurality of transfer plates comprising a substantially planar member comprising an at least partially elliptical segment.

11. The industrial tower of claim 10, wherein:
    each of said at least partially elliptical segment is connected to an interior surface of said hollow cylinder.

12. The column of claim 10, wherein:
    said angular disposition is an acute angle.

13. The column of claim 10, wherein:
    said angular disposition is an obtuse angle.

14. The column of claim 10, wherein:
    said industrial tower having a foundation end and a distal end; and
    at least one support member intermediate said foundation end and said distal end.

15. An industrial tower for enhancing surface contact of a first fluid with a second fluid, comprising:
    a hollow column body;
    said hollow column body on a foundation at an angular disposition with respect to the horizontal plane;
    said angular disposition offset from vertical;
    a plurality of transfer plates attached to an interior wall of said hollow column body;
    each of said plurality of transfer plates being inclined with respect to the horizon;
    said column body having a foundation end and a distal end; and
    at least one support member intermediate said foundation end and said distal end.

16. The industrial tower of claim 15, wherein:
    said angular disposition is an acute angle.

17. The industrial tower of claim 15, wherein:
    said angular disposition is an obtuse angle.

18. The industrial tower of claim 15, wherein:
    each said plurality of transfer plates comprising a substantially planar member;
    each said plurality of transfer plates comprising an at least partially elliptical segment; and
    each said plurality of transfer plates connected to said interior wall of said hollow column body proximate said at least partially elliptical segment.

19. A method for constructing a column for distillation or fluid-fluid separation, said method comprising:
providing a hollow column body;
determining a desired output of said column;
determining an angular position of said column to achieve said desired output;
installing said column body on a foundation at said angular disposition with respect to the horizontal plane;
said angular disposition offset from vertical;
fixedly attaching a plurality of transfer plates to the interior of said hollow column body, each of said transfer plates being horizontally oriented; and
providing at least one support member intermediate a foundation end of said column and a second distal end of said column.

20. The column of claim 19, wherein:
said step of fixedly attaching a plurality of transfer plates to the interior of said hollow column body occurs prior to said step of installing said column body on a foundation at said angular disposition with respect to the horizontal plane.

21. An industrial tower for enhancing surface contact of a first fluid with a second fluid, comprising:
said industrial tower comprising a hollow cylinder;
said industrial tower having an angular disposition other than vertical in relation to the horizontal plane;
a plurality of transfer plates provided internally of said hollow cylinder;
said plurality of transfer plates are inclined with respect to the horizon; and
each said plurality of transfer plates comprising a substantially planar member comprising an at least partially elliptical segment.

22. The column of claim 21, wherein:
said angular disposition is an acute angle.

23. The column of claim 21, wherein:
said angular disposition is an obtuse angle.

24. The column of claim 21, wherein:
said industrial tower having a foundation end and a distal end; and
at least one support member intermediate said foundation end and said distal end.

* * * * *